United States Patent
Arnold, III

(10) Patent No.: US 9,453,642 B2
(45) Date of Patent: Sep. 27, 2016

(54) TORCH AND TORCH ATTACHMENT

(71) Applicant: Booker & Dax, LLC, New York, NY (US)

(72) Inventor: David E. Arnold, III, New York, NY (US)

(73) Assignee: Booker & Dax, LLC, New York, NY (US)

(*) Notice: Subject to any disclaimer, the term of this patent is extended or adjusted under 35 U.S.C. 154(b) by 202 days.

(21) Appl. No.: 13/779,807

(22) Filed: Feb. 28, 2013

(65) Prior Publication Data

US 2014/0242529 A1    Aug. 28, 2014

(51) Int. Cl.
| | |
|---|---|
| *F23D 14/56* | (2006.01) |
| *F23D 14/12* | (2006.01) |
| *F23D 14/28* | (2006.01) |
| *A23L 1/01* | (2006.01) |
| *A23L 3/005* | (2006.01) |

(52) U.S. Cl.
CPC ............ *F23D 14/56* (2013.01); *F23D 14/125* (2013.01); *F23D 14/28* (2013.01); *A23L 1/01* (2013.01); *A23L 1/0128* (2013.01); *A23L 3/005* (2013.01)

(58) Field of Classification Search
USPC .......................................................... 431/157
See application file for complete search history.

(56) References Cited

U.S. PATENT DOCUMENTS

| | | | |
|---|---|---|---|
| 3,139,879 A * | 7/1964 | Bauer et al. ................ 126/4 |
| 3,179,156 A * | 4/1965 | Weiss et al. ................ 431/329 |
| 3,223,139 A | 12/1965 | Smith | |
| 3,229,680 A * | 1/1966 | Truman et al. ............. 126/92 B |
| 3,330,267 A * | 7/1967 | Bauer ........................ 126/92 R |
| 3,391,983 A * | 7/1968 | Harazono et al. ............ 431/329 |
| 3,472,601 A * | 10/1969 | Kazuo et al. ................. 431/328 |
| 3,561,422 A * | 2/1971 | Colin-Smith ............... 126/92 B |
| 3,733,170 A * | 5/1973 | Kobayashi et al. ........... 431/329 |
| 3,814,573 A * | 6/1974 | Karlovetz ................... 431/329 |
| 3,852,025 A * | 12/1974 | Placek ........................ 431/329 |
| 3,857,670 A * | 12/1974 | Karlovetz et al. ............. 431/329 |
| 3,975,140 A * | 8/1976 | Placek ........................ 431/329 |
| 4,726,767 A | 2/1988 | Nakajima | |
| 5,178,535 A * | 1/1993 | Delalle ........................ 432/225 |
| 5,645,043 A * | 7/1997 | Long et al. ............... 126/92 AC |
| 6,302,096 B1 * | 10/2001 | Duncan ........................ 126/38 |
| 7,631,640 B2 * | 12/2009 | Hofbauer et al. ........... 126/39 R |
| 2008/0274434 A1 | 11/2008 | Burdsall | |
| 2010/0151398 A1 * | 6/2010 | Smith ......................... 431/125 |

* cited by examiner

*Primary Examiner* — Gregory Huson
*Assistant Examiner* — Martha Becton
(74) *Attorney, Agent, or Firm* — Kirschstein, Israel, Schiffmiller & Pieroni, P.C.

(57) ABSTRACT

An attachment for a torch includes a combustion cone mounted on a fuel delivery tube. The combustion cone bounds a combustion chamber and has an inlet through which fuel from the tube enters the chamber to create a flame when the torch ignites the fuel. The cone diverges away from the inlet and to an outlet to enable the flame to diverge and spread within the chamber. The chamber substantially contains the flame therein. At least one apertured radiator, and preferably, a pair of apertured radiators, is mounted in the chamber in direct contact with the flame, and heated by the flame to a temperature sufficient to cause each radiator to radiate infrared radiation through and past the outlet. A tipping-resistant holder holds a fuel canister of the torch upright when placed on a support surface.

18 Claims, 9 Drawing Sheets

TORCH AND TORCH ATTACHMENT

FIELD OF THE DISCLOSURE

The present disclosure relates generally to a burner or fuel torch, especially a handheld torch for use in a kitchen, and to a burner or torch attachment that uniformly spreads and diffuses a flame produced by the torch over a broad, uniform area to expedite cooking, and that slows and confines the flame substantially within the torch attachment to enhance complete fuel combustion and to minimize risk of kitchen fire, and that substantially converts the fuel combustion to thermal radiation, especially infrared radiation, to heat and cook foods by irradiation, as well as to a tipping-resistant holder to prevent a vessel, such as a fuel canister of the torch, from tipping over when the torch is placed upright on a support surface when not handheld.

BACKGROUND

Handheld, gas-fueled torches, which ignite a source of fuel, such as butane or propane, by a spark generated by a piezoelectric igniter, create an intensely hot flame and are frequently employed as kitchen torches to caramelize sugar in cooking, such as when making creme brûlée. The kitchen torches may be marketed as food torches, cooking torches, or culinary torches. Use of such torches in the kitchen is not limited to caramelizing sugar. They can be used, for example, to melt or brown toppings on casseroles or soups, to melt cheese, to fire-roast or char vegetables, such as peppers, to toast bread or marshmallows, and to broil meats, such as steaks, as well as many other uses, both in and out of the kitchen.

Yet, as generally satisfactory as such kitchen torches have been, their usage has not been widespread for several reasons. One primary concern is that the flame produced by the torch is naked and exposed, i.e., it extends beyond the torch, and thus represents a kitchen fire safety risk, especially if the torch is handled by an inexperienced cook. In addition, the naked, exposed flame is focused and has a thin pencil shape. It is difficult and time-consuming, for example, in making crème brûlée, to evenly scorch a broad area of a custard base to form a uniform top layer of caramel, by repetitively moving a thin, pencil-like flame across a wide, upper surface of the custard base. In broiling steak, as another example, some areas of the steak may be burnt and colored dark, while other areas of the steak may be partially scorched, or even unheated, and colored less dark. Furthermore, if the flames of such torches are not properly adjusted, or are too hot, or are too fast, and/or if fuel combustion is incomplete, then certain foods, when cooked with such carburizing flames, exhibit an undesirable "torch taste" in which off-flavors and unpleasant smells are imparted to the food. This is believed to be due to uncombusted hydrocarbons.

Many of these foods have heretofore been cooked in conventional kitchen equipment, such as ovens, grills and salamanders. However, none of these pieces of equipment are handheld, and they are not readily portable or inexpensive, and although these pieces are generally available in industrial or professional kitchens, at least some of these pieces are not generally available in one's home or in amateur kitchens. Typically, such equipment has to be furnished with a hood, cannot be used to heat a small area, or a food that is already on a plate, and does not have a sufficiently high watt density to properly finish a low temperature meat.

Accordingly, it would be desirable to increase the usage, popularity and safety of such kitchen torches, especially by inexperienced or amateur cooks, to expedite cooking, to enhance substantially complete fuel combustion to avoid torch taste, to minimize the kitchen fire safety risk, and to rapidly and uniformly heat and cook foods over a broad area by infrared irradiation, rather than with a focused, pencil-shaped, narrow, naked, and exposed flame.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9 is a perspective view of the holder of FIG. 6 when holding a canister of a first size.

Figure 1:
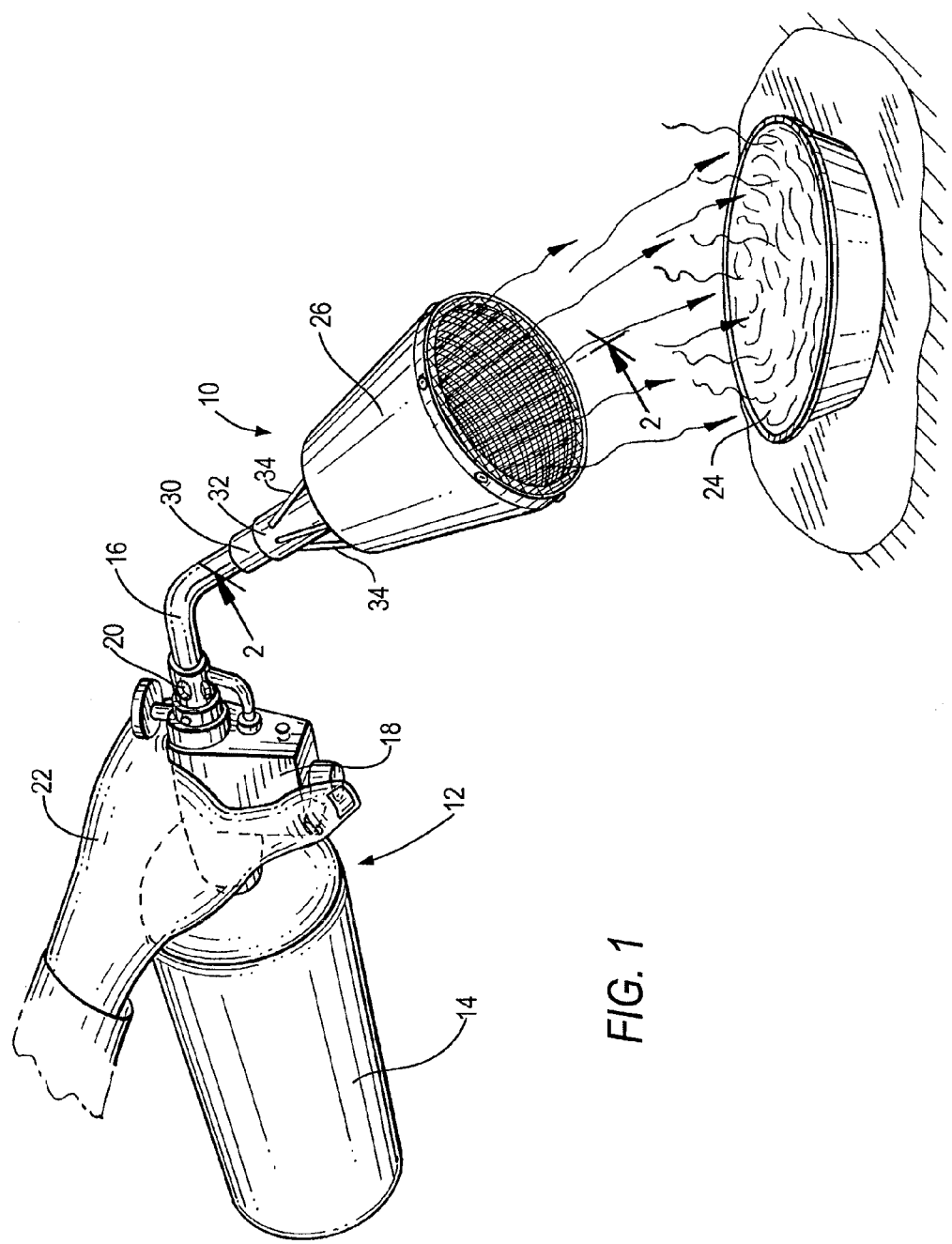
FIG. 1 is a perspective view of one embodiment of a handheld torch during use in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An attachment for a burner or torch having a fuel delivery tube, also known as a burn tube, in accordance with one aspect of this invention, includes a combustion cone mounted on the fuel delivery tube and bounding a combustion chamber. The combustion cone has an inlet through which fuel from the fuel delivery tube enters the combustion chamber to create a flame when the fuel is ignited, typically by a spark from a piezoelectric igniter, and an outlet spaced away from the inlet along a longitudinal direction. The combustion cone is preferably constituted of a lightweight metal having a low thermal mass, and diverges along the longitudinal direction away from the inlet and to the outlet to enable the flame to diverge and spread within the combustion chamber. The combustion chamber substantially contains the flame therein. At least one apertured radiator, and preferably, a pair of apertured radiators, each, for example, being an openwork wire mesh or apertured screen constituted of a high temperature-resistant, low thermal mass, material, e.g., nichrome, is mounted in the combustion chamber in direct contact with the flame, and is heated by the flame to a temperature sufficient to cause each radiator to radiate thermal radiation, preferably infrared radiation, through and past the outlet. In a preferred embodiment, each wire mesh has a mesh size between 18×18 and 24×24, has an open area that is preferably about 35%-55% of the total area thereof, and is constructed from a wire having a wire diameter between 0.04 inches and 0.014 inches. The radiation can be used for various heating applications, especially for food preparation in the kitchen.

Advantageously, a liner or blanket of thermal insulation, such as alumina silicate, is provided inside the combustion cone and lines the combustion chamber. An optional heat shield may be mounted exteriorly on, and around, the combustion cone. The combustion cone has mounting arms for spacing the inlet away from an end or tip of the fuel delivery tube to form an air gap through which ambient air enters the inlet. The attachment also has an adjustable collar for adjustably fitting the combustion cone on fuel delivery tubes of different sizes, e.g., diameters between one-half and one inch.

In accordance with another aspect of this invention, a burner or torch, especially a handheld torch, having a fuel delivery tube and a fuel canister is equipped with the above-described attachment, and are sold together as an assembled unit. In some applications, the fuel delivery tube is bent away from an upright axis of the fuel canister and, as a result, the mounting of the attachment shifts the center of gravity away from the axis. Advantageously, a tipping-resistant holder is mounted on a bottom of the fuel canister to prevent the canister from tipping over when not handheld and/or placed to rest on a support surface, such as a tabletop or a countertop. The holder adjustably grips canisters of different sizes, e.g., diameters between two and one-half and four inches. The holder has a pair of pivotably interconnected, elongated jaws having spaced-apart opposite end regions that contact the support surface and stably support the respective canister. The jaws also may have generally planar support plates, as well as legs having generally planar bottom walls, all of which extend in a plane generally parallel to the support surface. The holder may also advantageously have a plurality of upright resilient members that resiliently engage and hold the canister upright.

Turning now to the drawings, reference numeral 10 in FIG. 1 generally identifies one embodiment of a torch attachment for a burner or handheld torch 12 having a fuel canister 14 containing a source of fuel, such as butane or propane, and a fuel delivery tube 16, also known as a burn tube. Other fuels could be contained in the canister 14. A built-in piezoelectric igniter 18 on the torch 12 is manually actuated by a user to create a spark that ignites the fuel to produce a flame in the tube 16. Use of the piezoelectric igniter 18 is optional, because other igniters, both internal and external of the torch 12, could be employed. Indeed, an external sparker, or a match, could be used to ignite the fuel. Air holes 20 admit ambient air into the tube 16 to support ignition and flame combustion. As illustrated, the tube 16 is preferably bent and angled away from the user's hand 22. As described below, in use, the torch attachment 10 radiates thermal radiation, especially in the form of infrared radiation (depicted by wavy arrows in the figures), to heat various products, such as, by way of non-limiting example, a serving of crème brûlée 24 depicted in FIG. 1.

Figure 2:
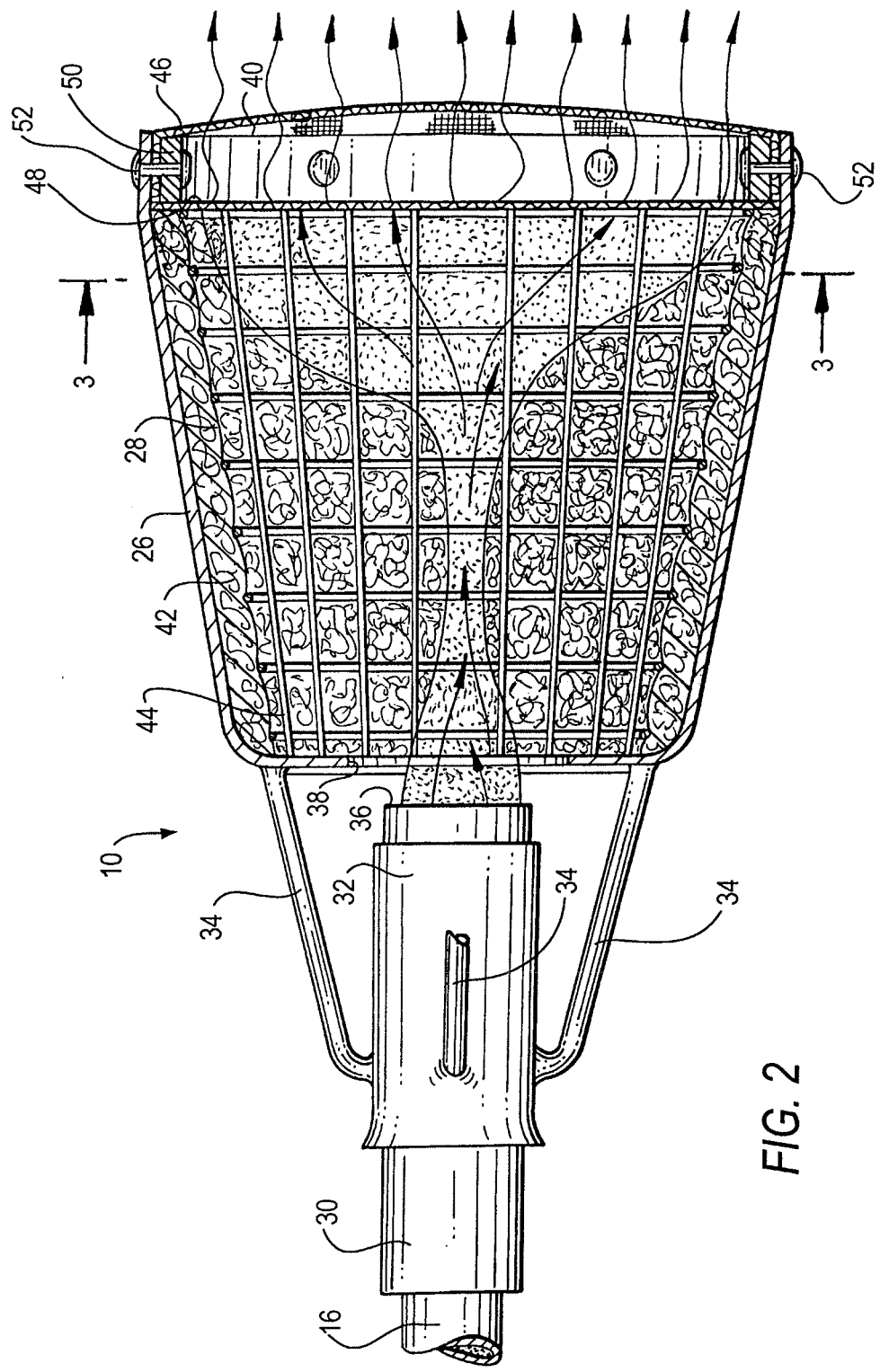
FIG. 2 is an enlarged sectional view taken on line 2-2 of FIG. 1.

As best shown in FIG. 2, the torch attachment 10 includes a generally bell-shaped combustion cone 26 mounted on the fuel delivery tube 16 with the aid of an adjustable collar 30, and bounding an internal combustion chamber 28. The adjustable collar 30, preferably a split ring, is operative for adjustably fitting the combustion cone 26 on fuel delivery tubes 16 of different sizes, e.g., diameters between one-half and one inch. A tubular extension sleeve 32 is fixedly connected to the collar 30, and a plurality of rigid mounting arms 34 extend between the sleeve 32 and the combustion cone 26. The sleeve 32 has an outer tip 36 that is deliberately positioned by the arms 34 at a distance or flame gap away from the combustion cone 26.

The combustion cone 26 has a rear inlet 38 through which the fuel from the fuel delivery tube 16 enters the combustion chamber 28 to create a flame when the fuel is ignited by the spark from the piezoelectric igniter 18, and a front outlet 40 spaced away from the inlet 38 along a longitudinal direction. The aforementioned flame gap allows more ambient air into the rear inlet 38 to assist in fuel combustion inside the combustion chamber 28, and also prevents overheating, melting, or destruction of the tip 36. The combustion cone 26 is preferably constituted of a lightweight, thin metal having a low thermal mass, and diverges, at least in part, along the longitudinal direction away from the inlet 38 and to the outlet 40 to enable the flame to diverge and spread within the combustion chamber 28. A liner 42 or blanket of thermal insulation, such as alumina silicate, is provided inside the combustion cone 26 and lines the inner circumferential wall of the combustion chamber 28. A metal wire retainer basket 44 of complementary contour to that of the combustion cone 26 retains the liner 42 in place against the inner circumferential wall of the combustion chamber 28.

The torch attachment 10 also has an outer apertured radiator 46 mounted at the outlet 40, and preferably also has an inner apertured radiator 48 mounted inside the combustion cone 26. Each radiator 46, 48, is configured, for example, as an openwork wire mesh or apertured screen, preferably constituted of a high temperature-resistant, low thermal mass, thin, generally planar, material, e.g., nichrome. The radiators 46, 48 are held apart at a fixed spacing by an annular metal ring 50 that is fixedly connected to the combustion cone 26 by fasteners 52. In one advantageous embodiment, this fixed spacing is on the order of 5/32 inch to 1/4 inch; and each wire mesh has a mesh size between 18×18 and 24×24, has an open area that is preferably about 35%-55% of the total area thereof, and is constructed from a wire having a wire diameter between 0.04 inches and 0.014 inches. Each radiator 46, 48 is mounted in the combustion chamber 28 in direct contact with the flame, and is heated by the flame to a temperature sufficient to cause each radiator 46, 48 to radiate thermal radiation, preferably infrared radiation, through and past the outlet 40. The radiator 48 acts to diffuse the flame incident thereon. The radiation can be used for various heating applications, especially for food preparation in the kitchen, as depicted in FIG. 1.

The radiators 46, 48 not only act to convert a large portion of the combustion energy inside the combustion chamber 28 to infrared radiation, but also act as flame slowers to slow the speed of the flame inside the combustion chamber 28 and allow a more complete combustion therein. The radiators 46, 48 also act as flame spreaders to spread and diffuse the flame out over a larger area to create an even thermal radiation over a broad area, and thereby give the user more heating control. The liner 42 not only protects the combustion cone 26 from overheating, but also shields a user from excess heat being directed rearwardly toward the user's hand 22 and also serves to radiate thermal radiation through the outlet 40. The retainer basket 44 also has a low thermal mass and radiates thermal radiation through the outlet 40. The combustion cone 26, together with the radiators 46, 48, the liner 42, and the retainer basket 44, substantially contain the flame inside the combustion chamber 28, and the flame is not, as in the known art, naked and exposed. The fuel is substantially combusted inside the combustion chamber 28 and does not, as in the known art, impart a torch taste to a heated food. The diverging combustion cone 26, together with the radiators 46, 48, the liner 42, and the retainer basket 44, substantially prevent the thermal radiation from radiating backwards and burning the user's hand 22, and substantially prevent backscatter of oils/fats from a food being heated from interfering with the flame and the combustion occurring inside the combustion cone. The diverging combustion cone 26, together with the radiators 46, 48, the liner 42, and the retainer basket 44, substantially direct the thermal radiation, which would otherwise be wasted, out of the front outlet 40, instead of letting the thermal radiation escape from the lateral sides or rear of the combustion cone 26. The lightweight and low thermal mass properties of the combustion cone 26, the radiators 46, 48, the liner 42, and the retainer basket 44 enable the torch attachment to efficiently and rapidly be heated up and cooled down.

Figure 3:
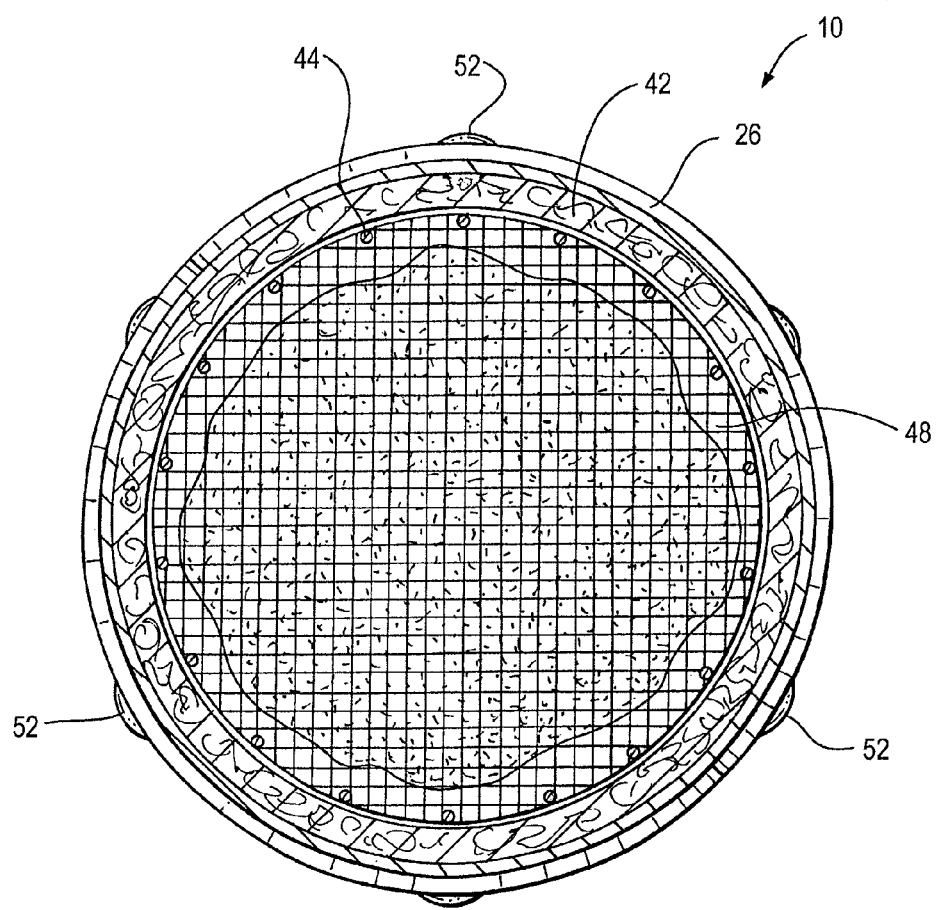
FIG. 3 is a sectional view taken on line 3-3 of FIG. 2.
Figure 4:
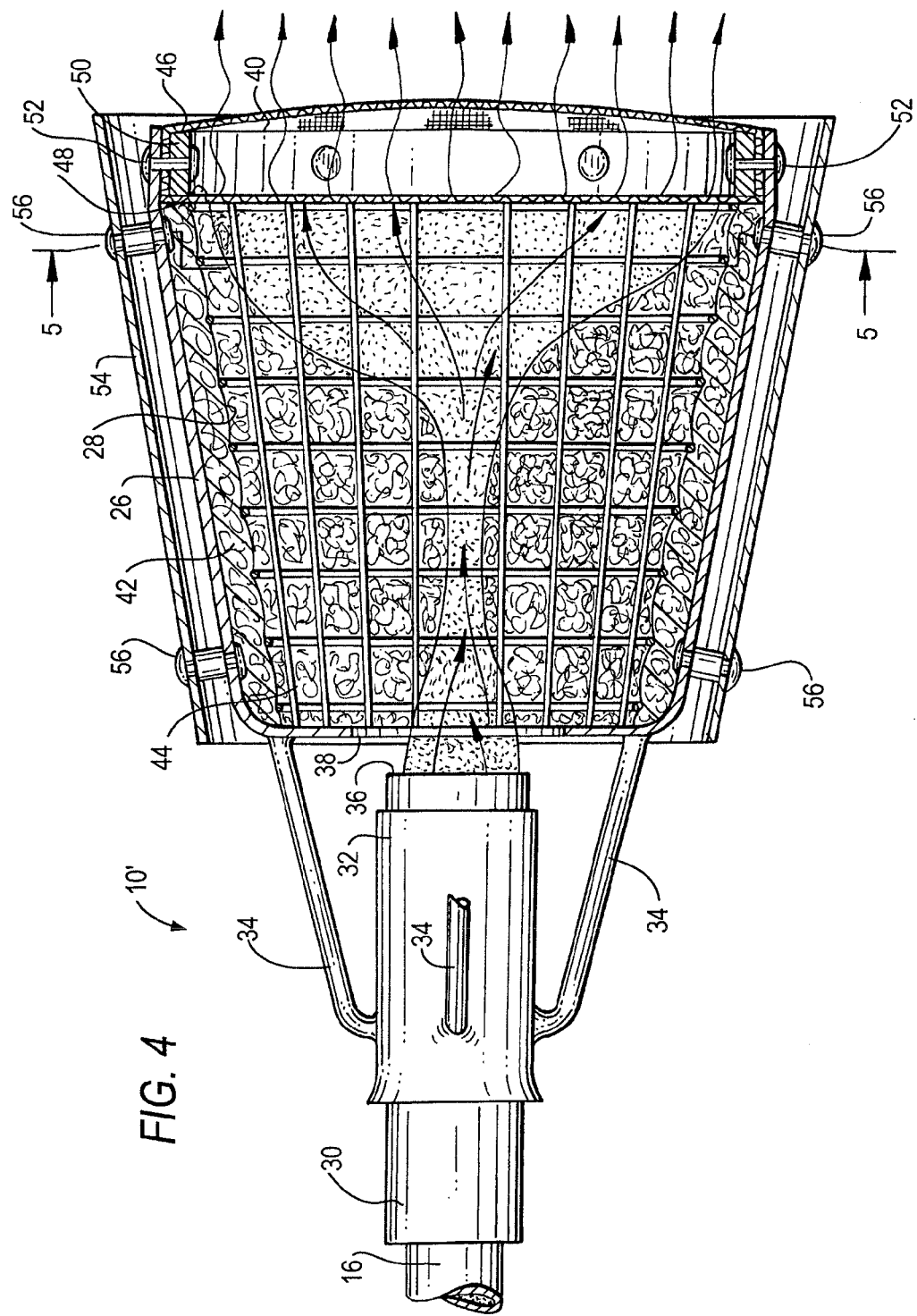
FIG. 4 is a view analogous to FIG. 2, but of another embodiment of this invention.
Figure 5:
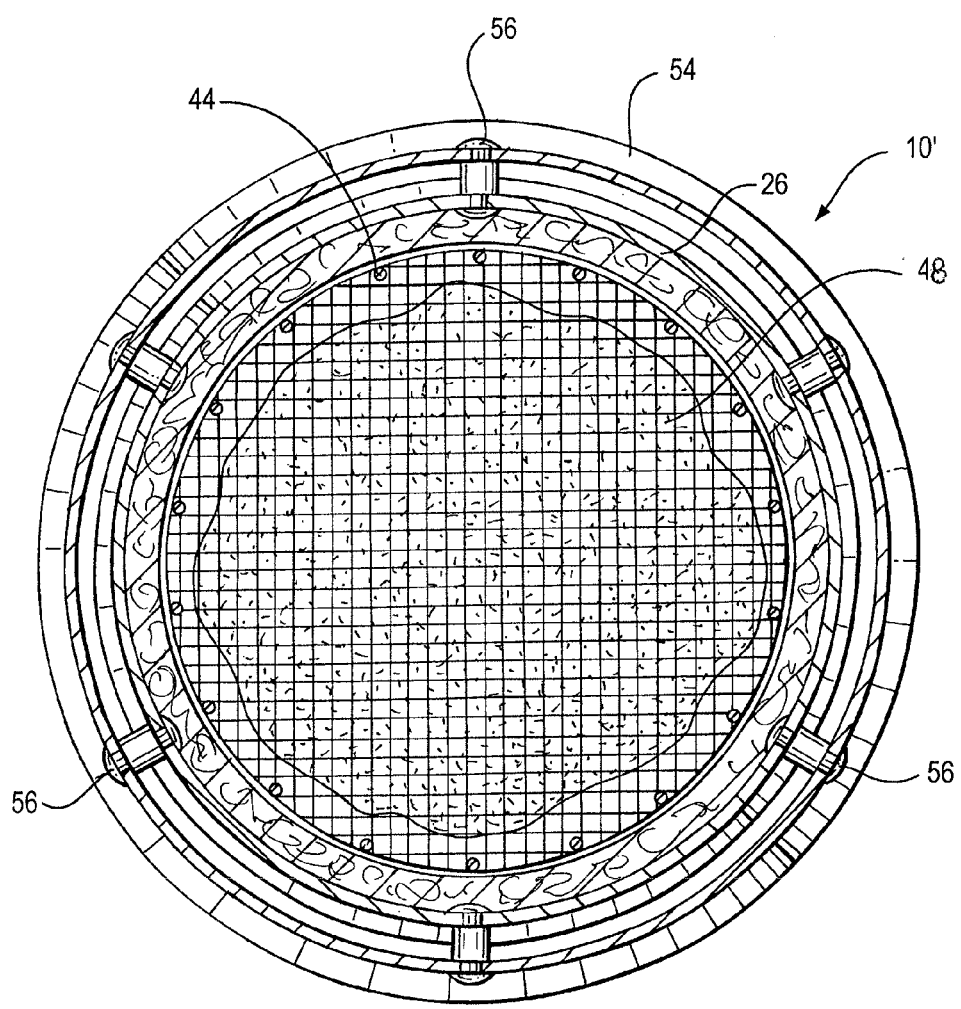
FIG. 5 is a sectional view taken on line 5-5 of FIG. 4.
Figure 6:
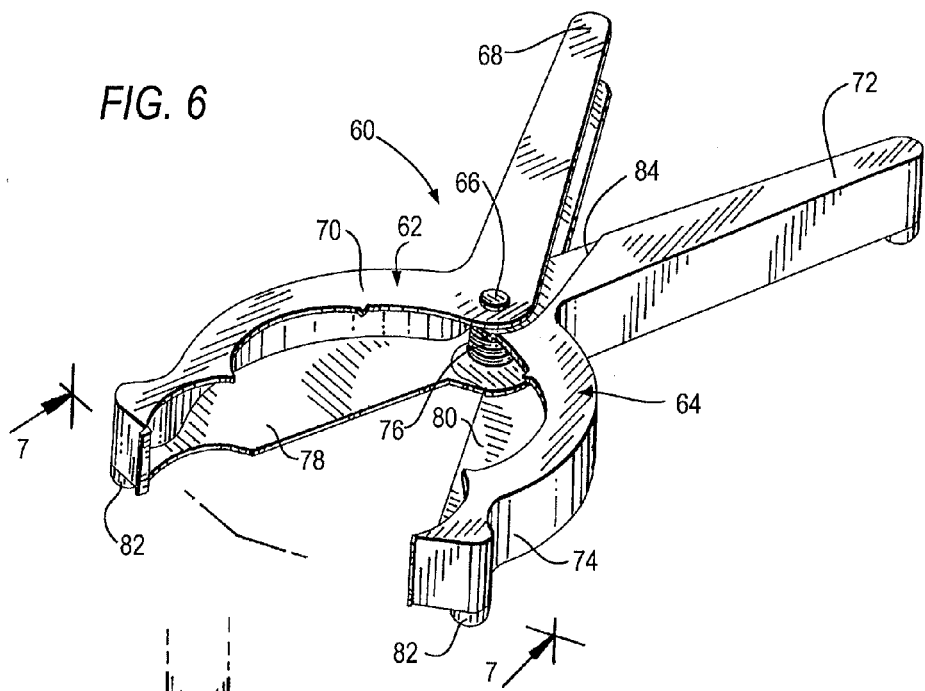
FIG. 6 is a perspective view of one embodiment of a tipping-resistant holder for holding vessels or canisters of different sizes in accordance with this invention.
Figure 7:
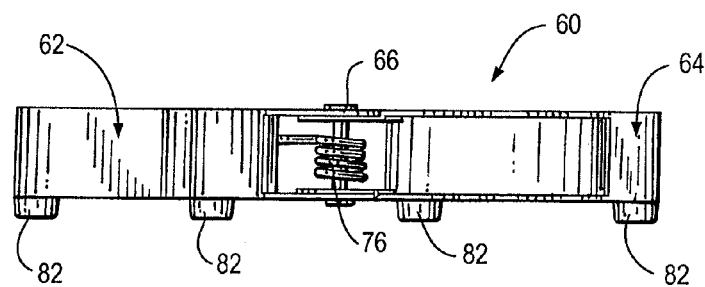
FIG. 7 is a sectional view taken on line 7-7 of FIG. 6.

Another embodiment of a burner or torch attachment 10' is depicted in FIGS. 4-5 and is essentially identical to the torch attachment 10 depicted in FIGS. 2-3, except for the provision of an additional heat shield 54 mounted exteriorly on, and circumferentially around, the combustion cone 26 with the aid of fasteners 56. Otherwise, like reference numerals have been employed to identify like parts. The heat shield 54 is advantageously frustoconically-shaped, is constituted of a metal or heat insulating material, and diverges in a direction from the rear inlet 38 to the front outlet 40.

The torch attachment 10, 10' may be sold by itself as an add-on accessory for the torch 12, or, in accordance with another aspect of this invention, the torch and the torch attachment 10, 10' may be sold together as an assembled unit. As described above, in some applications, the fuel delivery tube 16 is bent away from an upright axis of the fuel canister 14 and, as a result, the mounting of the torch attachment 10, 10' shifts the center of gravity away from the axis. Advantageously, as shown in FIGS. 6-11, one embodiment of a tipping-resistant holder 60, in accordance with still another aspect of this invention, is mounted on canisters of different sizes 14A, 14B, 14C, e.g., diameters between two and one-half and four inches. to prevent each canister from tipping over when not handheld and/or placed to rest on a support surface, such as a tabletop or a countertop.

The holder 60 includes a pair of elongated jaws 62, 64 pivotably interconnected at a pivot 66 for pivoting movement. Jaw 62 has an elongated leg 68 with a flat bottom surface, a generally C-shaped grip 70, and a generally planar, bottom support plate 78 that is generally coplanar with the bottom surface of the leg 68. Jaw 64 has an elongated leg 72 with a flat bottom surface, a generally C-shaped grip 74, and a generally planar, bottom support plate 80 that is generally coplanar with the bottom surface of the leg 72. A coil spring 76 constantly urges the grips 70, 74 toward each other. Support feet 82 are mounted on bottom surfaces of the jaws 62, 64 at spaced-apart opposite end regions thereof. A clearance slot 84 on the leg 72 receives a portion of the leg 68 during pivoting movement of the jaws.

Figure 10:
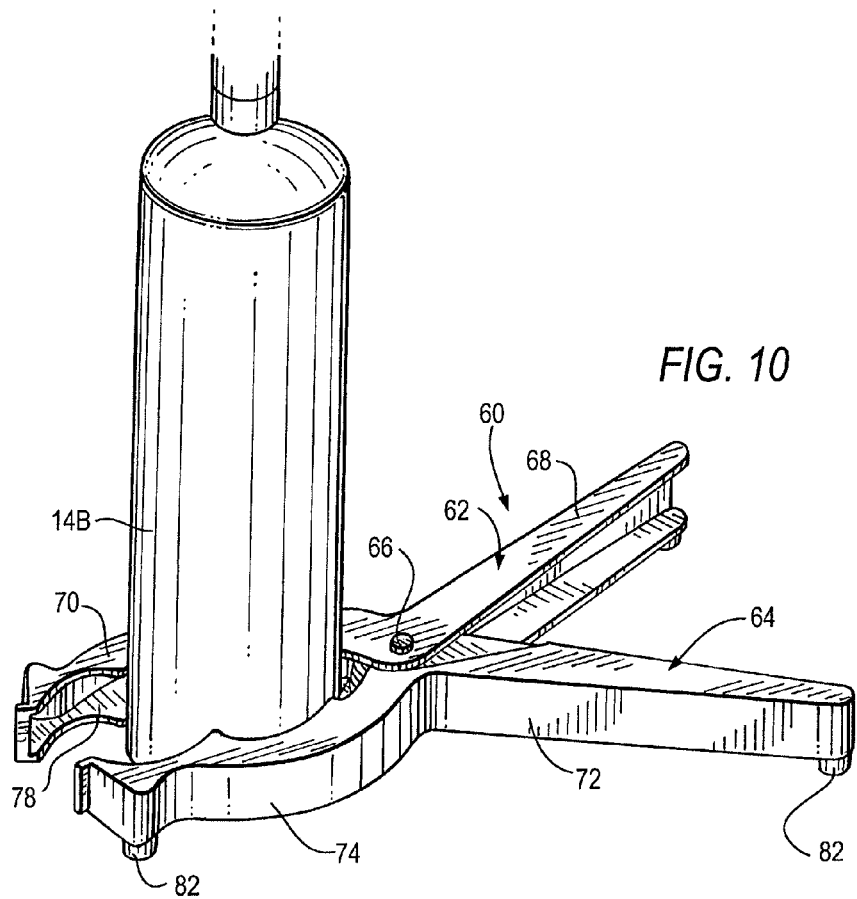
FIG. 10 is a perspective view of the holder of FIG. 6 when holding a canister of a different second size.
Figure 8:
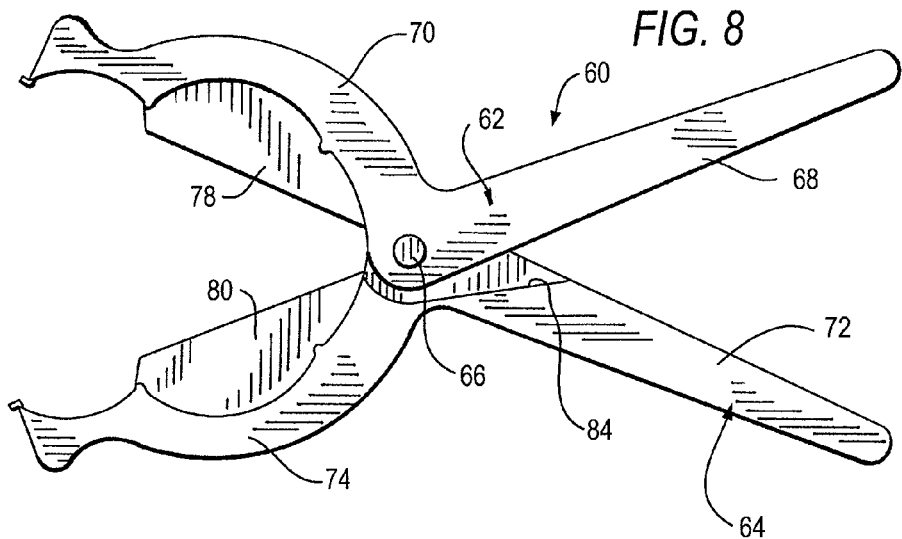
FIG. 8 is a top plan view of the holder of FIG. 6.
Figure 11:
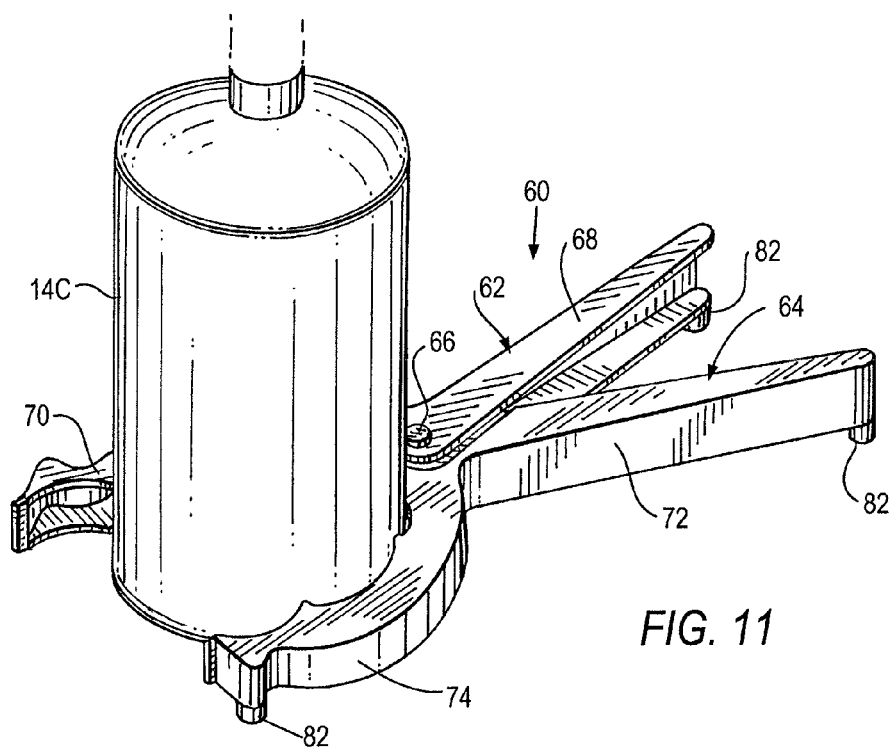
FIG. 11 is a perspective view of the holder of FIG. 6 when holding a canister of a different third size.

In use, the legs 68, 70 are squeezed together against the restoring force of the spring 76 until the C-shaped grips 70, 74 are spaced sufficiently apart to span opposite sides of the bottom of either the canister 14A of FIG. 9, or the canister 14B of FIG. 10, or the canister 14C of FIG. 11. The legs 68, 70 are then released, thereby causing the spring 76 to release its stored energy and move the legs 68, 70 apart, and concomitantly move the C-shaped grips 70, 74 towards each other and into gripping engagement with the opposite sides of a respective canister. The canister 14A is illustrated as being further from the pivot 66, but it could also be positioned closer to the pivot, as in the case of canisters 14B, 14C.

Thus, the holder 60 is adjustable in that it can be used on canisters of different sizes. The four opposite end regions of the jaws 62, 64 are spaced-apart contact points that serve to stably support a respective canister on the support surface. The support feet 82 at these contact points are optional. For further support, the generally coplanar support plates 78, 80 and the bottom surfaces of the legs 68, 72 extend generally parallel to the support surface to assist the contact points in preventing the respective canister from tipping over when placed upright on the support surface. Advantageously, the base of the respective canister rests directly on top of the support plates 78, 80, although, as described below, the base can also be slightly raised relative to the support plates 78, 80. The holder 60 may be sold by itself as an add-on accessory for the torch 12, or, in accordance with another aspect of this invention, the holder 60, the torch 12 and the torch attachment 10, 10' may all be sold together as an assembled unit.

In the foregoing specification, specific embodiments have been described. However, one of ordinary skill in the art appreciates that various modifications and changes can be made without departing from the scope of the invention as set forth in the claims below. For example, although the torch described and illustrated herein is especially useful in the kitchen to heat food, the torch could be used in other applications, such as general purpose heating, soldering, brazing, welding, and the like. In addition, the torch need not be handheld. Accordingly, the specification and figures are to be regarded in an illustrative rather than a restrictive sense, and all such modifications are intended to be included within the scope of present teachings.

As another example, rather than using a single torch attachment as a source of heat, a plurality of torch attachments, each identical to attachment 10, for example, could be arranged in an array such that the respective outlets 40 generally lie in a common plane. In this event, the outlets 40 could all face downwardly and serve as an overhead stationary heater or oven-style burner, or they could all face upwardly and serve as a bottom stationary heater or oven-style burner. Additional attachments could have their outlets 40 positioned off to the sides of a heating area. The term "torch" is intended to encompass all such plural torches and oven-style burners.

Figure 12:
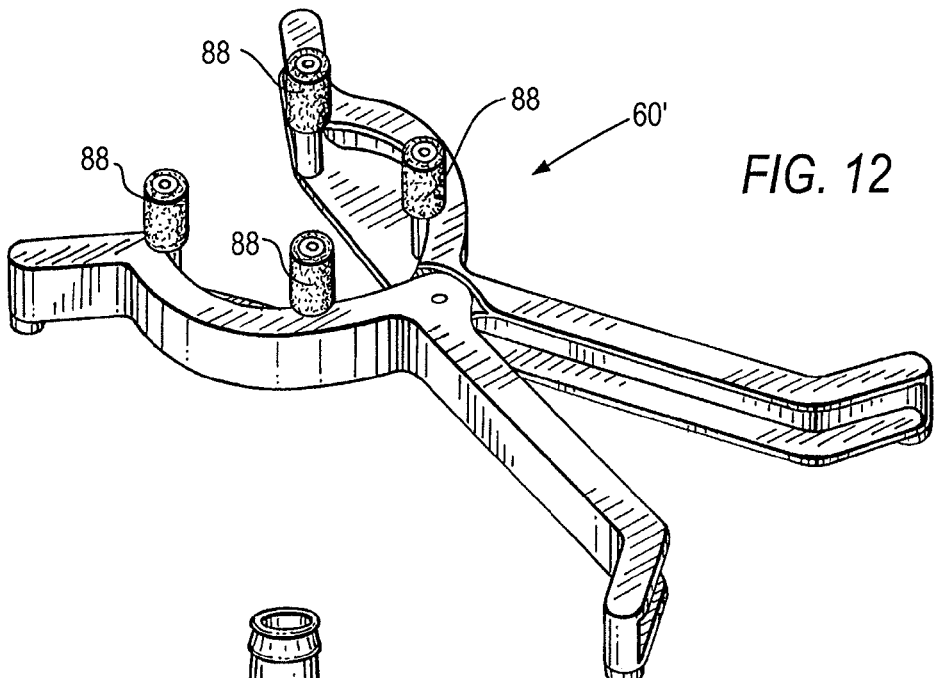
FIG. 12 is a perspective view of another embodiment of a tipping-resistant holder for holding vessels or canisters of different sizes in accordance with this invention.
Figure 13:
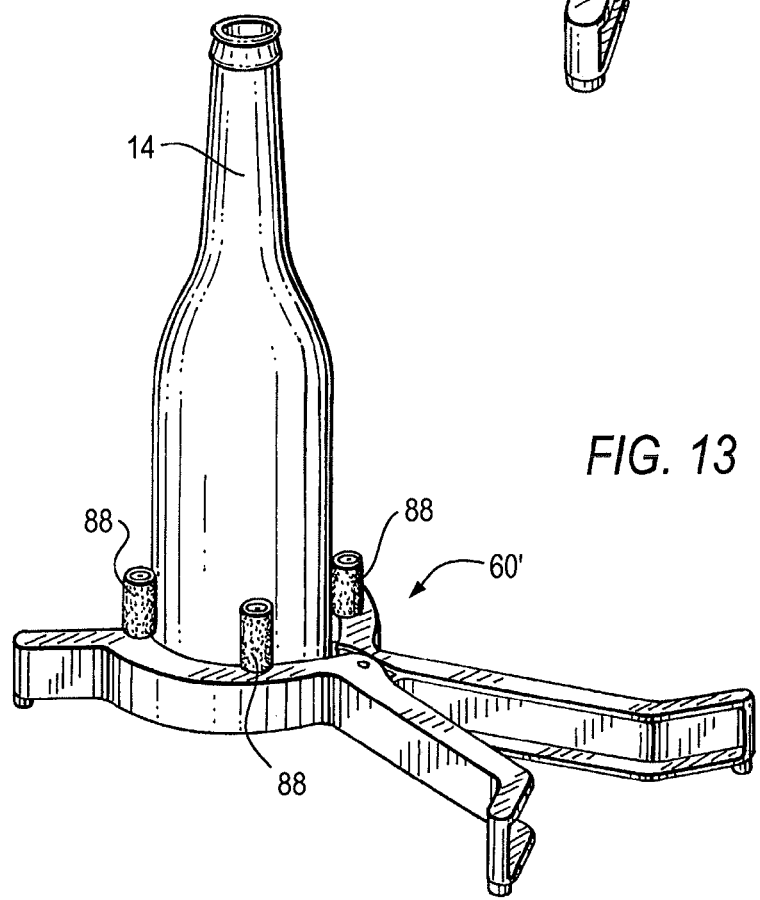
FIG. 13 is a perspective view of the holder of FIG. 12 when holding a representative canister.

As still another example, rather than using the holder 60 to prevent tipping of a fuel canister, the holder 60 could be used with any other vessel or bottle that is desired to be held upright without spillage of its contents. In another embodiment, as shown in FIGS. 12-13, a holder 60' may be provided with a plurality of upright resilient or cushioned members 88 in order to prevent scratching of the canister or like representative vessel 14 to be gripped, and to compensate for any irregularities that may be present at the lower region of the respective vessel. The upright members 88 are advantageously hollow rubber tubular sleeves mounted on cylindrical posts. Although four upright members 88 are illustrated, three may be sufficient, and more than four may be desirable. The upright members 88 may either support the respective vessel so that its base rests directly on top of the support plates 78, 80, or its base can be slightly raised relative to the support plates 78, 80.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An attachment for a torch for igniting fuel and air to produce a flame in a burn tube, the attachment comprising:
   a combustion cone mounted on the burn tube and bounding an internal chamber, the combustion cone having an inlet through which the flame enters the chamber, and an outlet spaced away from the inlet along a longitudinal direction, the outlet being larger in opening size than the inlet, the combustion cone diverging along the longitudinal direction away from the inlet and to the larger outlet to enable the flame entering the chamber to diverge and spread within the chamber along the longitudinal direction; and
   at least one apertured radiator mounted in the chamber and extending transversely of the longitudinal direction across the outlet, the radiator being positioned in direct contact with, and heated by, the spread flame to a temperature sufficient to cause the radiator to radiate thermal radiation through and past the outlet.

2. The attachment of claim 1, wherein the chamber has an inner circumferential surface, and further comprising a liner of thermal insulation inside the combustion cone and lining the inner circumferential surface of the chamber.

3. The attachment of claim 1, and further comprising a heat shield mounted exteriorly on, and circumferentially surrounding, the combustion cone.

4. The attachment of claim 1, wherein the combustion cone has mounting arms for spacing the inlet away from an end of the burn tube to form an air gap.

5. The attachment of claim 1, wherein the combustion cone has an adjustable collar for adjustably fitting the combustion cone on the burn tube.

6. The attachment of claim 1, and an additional apertured radiator mounted in the chamber and extending transversely of the longitudinal direction across the outlet, the additional apertured radiator being spaced at a predetermined distance away from the at least one apertured radiator along the longitudinal direction, and also being positioned in direct contact with, and heated by, the spread flame to a temperature sufficient to cause the additional apertured radiator to also radiate thermal radiation through and past the outlet.

7. The attachment of claim 6, wherein each apertured radiator is an openwork element constituted of a high temperature-resistant material that emits infrared radiation when heated by the spread flame, and wherein each apertured radiator has a total area and an open area that is about 35% to 55% of the total area.

8. The attachment of claim 6, wherein the combustion cone and each apertured radiator is constituted of a lightweight metal having a low thermal mass.

9. A torch comprising:
   a fuel canister containing fuel;
   a burn tube in communication with the fuel canister;
   an igniter for igniting the fuel and air to produce a flame in the burn tube; and
   an attachment for the torch, the attachment including a combustion cone mounted on the burn tube and hounding an internal chamber, the combustion cone having an inlet through which the flame enters the chamber, and an outlet spaced away from the inlet along a longitudinal direction, the outlet being larger in opening size than the inlet, the combustion cone diverging along the longitudinal direction away from the inlet and to the larger outlet to enable the flame entering the chamber to diverge and spread within the chamber along the longitudinal direction, and at least one apertured radiator mounted in the chamber and extending transversely of the longitudinal direction across the outlet, the radiator being positioned in direct contact with, and heated by, the spread flame to a temperature sufficient to cause the radiator to radiate thermal radiation through and past the outlet.

10. The torch of claim 9, wherein the chamber has an inner circumferential surface, and further comprising a liner of thermal insulation inside the combustion cone and lining the inner circumferential surface of the chamber.

11. The torch of claim 9, and further comprising a heat shield mounted exteriorly on, and circumferentially surrounding, the combustion cone.

12. The torch of claim 9, wherein the combustion cone has mounting arms for spacing the inlet away from an end of the burn tube to form an air gap.

13. The torch of claim 9, wherein the combustion cone has an adjustable collar for adjustably fitting the combustion cone on the burn tube.

14. The torch of claim 9, and an additional apertured radiator mounted in the chamber and extending transversely of the longitudinal direction across the outlet, the additional apertured radiator being spaced at a predetermined distance away from the at least one apertured radiator along the longitudinal direction, and also being positioned in direct contact with, and heated by, the spread flame to a temperature sufficient to cause the additional apertured radiator to also radiate thermal radiation through and past the outlet.

15. The torch of claim 14, wherein each apertured radiator is an openwork element constituted of a high temperature-resistant material that emits infrared radiation when heated by the spread flame, and wherein each apertured radiator has a total area and an open area that is about 35% to 55% of the total area.

16. The torch of claim 14, wherein the combustion cone and each apertured radiator is constituted of a lightweight metal having a low thermal mass.

17. The torch of claim 9, and a tipping-resistant holder mounted on the canister to prevent the canister from tipping over when placed on a support surface.

18. The torch of claim 17, wherein the holder has an adjustable grip for adjustably fitting the holder on canisters of different sizes.

* * * * *